United States Patent [19]
Dixon et al.

[11] Patent Number: 4,879,722
[45] Date of Patent: Nov. 7, 1989

[54] GENERATION OF COHERENT OPTICAL RADIATION BY OPTICAL MIXING

[75] Inventors: George J. Dixon, Lutz, Fla.; Douglas W. Anthon; John H. Clark, both of Wheaton, Ill.

[73] Assignee: Amoco Corporation, Chicago, Ill.

[21] Appl. No.: 125,161

[22] Filed: Nov. 25, 1987

Related U.S. Application Data
[63] Continuation-in-part of Ser. No. 78,373, Jul. 27, 1987.

[51] Int. Cl.$^4$ .............................................. H01S 3/10
[52] U.S. Cl. .................................... 372/21; 307/427; 372/22; 372/75
[58] Field of Search .............. 307/427, 424; 372/20, 372/21, 22, 75, 92

[56] References Cited
U.S. PATENT DOCUMENTS
3,530,301 9/1970 Boyd et al. .................... 307/427
4,791,631 12/1988 Baumert et al. ................ 372/22

OTHER PUBLICATIONS
Dupuis; "An Introduction to the Development of the Semiconductor Laser"; IEEE J. Quantum Electron., vol. QE-23, No. 6, pp. 651–657, 1987.

Primary Examiner—William L. Sikes
Assistant Examiner—B. R. R. Holloway
Attorney, Agent, or Firm—Richard A. Kretchmer; William H. Magidson; Ralph C. Medhurst

[57] ABSTRACT

An efficient, compact source of coherent radiation in the infrared, visible and ultraviolet portion of the spectrum which is capable of modulation rates over the range from 0 Hz to in excess of 1 GHz. The radiation is produced by optical mixing within an external optical cavity wherein at least one of the interacting beams of light is provided by a solid state device selected from the group consisting of laser diodes, laser diode arrays and diode-pumped solid state lasers.

30 Claims, 1 Drawing Sheet

GENERATION OF COHERENT OPTICAL RADIATION BY OPTICAL MIXING

CROSS-REFERENCE TO RELATED APPLICATIONS

This application is a continuation-in-part of application Ser. No. 78,373, filed July 27, 1987.

FIELD OF THE INVENTION

This invention relates to the generation of coherent optical radiation within an optical cavity by optical mixing. More particularly, it relates to the use of solid state components in such a process.

BACKGROUND OF THE INVENTION

A laser is a device which has the ability to produce monochromatic, coherent light through the stimulated emission of photons from atoms, molecules or ions of an active medium which have been excited from a ground state to a higher energy level by an input of energy. Such a device contains an optical cavity or resonator which is defined by highly reflecting surfaces which form a closed round trip path for light, and the active medium is contained within the optical cavity.

If a population inversion is created by excitation of the active medium, the spontaneous emission of a photon from an excited atom, molecule or ion undergoing transition to a lower energy state can stimulate the emission of photons of identical energy from other excited atoms, molecules or ions. As a consequence, the initial photon creates a cascade of photons between the reflecting surfaces of the optical cavity which are of identical energy and exactly in phase. A portion of this cascade of photons is then discharged through one or more of the reflecting surfaces of the optical cavity.

Excitation of the active medium of a laser can be accomplished by a variety of methods. However, the most common methods are optical pumping, use of an electrical discharge, and the passage of an electric current through the p-n junction of a semiconductor laser.

Semiconductor lasers contain a p-n junction which forms a diode, and this junction functions as the active medium of the laser. Such devices, which are also referred to as laser diodes, are typically constructed from materials such as gallium arsenide and aluminum gallium arsenide alloys. The efficiency of such lasers in converting electrical power to output radiation is relatively high and, for example, can be in excess of 40 percent.

The use of flashlamps, light-emitting diodes (as used herein, this term includes superluminescent diodes and superluminescent diode arrays), laser diodes and laser diode arrays to optically pump or excite a solid lasant material is well-known. Lasant materials commonly used in such solid state lasers include crystalline or glassy host materials into which an active material, such as trivalent neodymium ions, is incorporated. Detailed summaries of conventional crystalline lasant materials are set forth in the *CRC Handbook of Laser Science and Technology*, Vol. I, M. J. Weber, Ed., CRC Press, Inc., Boca Raton, Fla., 1982, pp. 72-135 and in *Laser Crystals*, Vol. 14 of the Springer Series in Optical Sciences, D. L. MacAdam, Ed., Springer-Verlag, New York, N.Y., 1981. Conventional host materials for neodymium ions include glass, yttrium aluminum garnet ($Y_3Al_5O_{12}$, referred to as YAG), $YAlO_3$ (referred to as YALO) and $LiYF_4$ (referred to as YLF). By way of example, when neodymium-doped YAG is employed as the lasant material in an optically pumped solid state laser, it is typically pumped by absorption of light having a wavelength of about 808 nm and emits light having a wavelength of 1,064 nm.

U.S. Pat. No. 3,624,545 issued to Ross on Nov. 30, 1971, describes an optically pumped solid state laser composed of a YAG rod which is side-pumped by at least one semiconductor laser diode. Similarly, U.S. Pat. No. 3,753,145 issued to Chesler on Aug. 14, 1973, discloses the use of one or more light-emitting semiconductor diodes to end pump a neodymium-doped YAG rod. The use of an array of pulsed laser diodes to end pump a solid lasant material such as neodymium-doped YAG is described in U.S. Pat. No. 3,982,201 issued to Rosenkrantz et al. on Sept. 21, 1976. Finally, D. L. Sipes, *Appl. Phys. Lett.*, Vol. 47, No. 2, 1985, pp. 74-75, has reported that the use of a tightly focused semiconductor laser diode array to end pump a neodymium-doped YAG results in a high efficiency conversion of pumping radiation having a wavelength of 810 nm to output radiation having a wavelength of 1,064 nm.

Materials having nonlinear optical properties are well-known. For example, U.S. Pat. No. 3,949,323 issued to Bierlen et al. on Apr. 6, 1976, discloses that nonlinear optical properties are possessed by materials having the formula $MTiO(XO_4)$ where M is at least one of K, Rb, Tl and $NH_4$; and X is at least one of P or As, except when $NH_4$ is present, then X is only P. This generic formula includes potassium titanyl phosphate, $KTiOPO_4$, a particularly useful nonlinear material. Other known nonlinear optical materials include, but are not limited to, $KH_2PO_4$, $LiNbO_3$, $KNbO_3$, $\beta$-$BaB_2O_4$, $Ba_2NaNb_5O_{15}$, $LiIO_3$, $HIO_3$, $KB_5O_8 \cdot 4H_2O$, potassium lithium niobate and urea. A review of the nonlinear optical properties of a number of different uniaxial crystals has been published in *Sov. J. Quantum Electron.*, Vol. 7, No. 1, January 1977, pp. 1-13. Nonlinear optical materials have also been reviewed by S. Singh in the *CRC Handbook of Laser Science and Technology*, Vol. III, M. J. Weber, Ed., CRC Press, Inc., Boca Raton, Fla., 1986, pp. 3-228.

The nonlinear nature of the optical susceptibility of nonlinear optical materials provides a coupling mechanism between electromagnetic waves that simultaneously pass through the material and can be used to generate radiation by the interaction of these waves. As used in this application, the term "optical mixing" refers to the interaction within a nonlinear optical material of two beams of light having frequencies $w_1$ and $w_2$ to produce optical radiation of a different frequency. For example, where $w_1$ is greater than $w_2$, this interaction can produce optical radiation at the sum-frequency, $w_3 = w_1 + w_2$, and at the difference-frequency, $w_4 = w_1 - w_2$. These two processes are referred to as sum-frequency generation and difference-frequency generation, respectively. Up-conversion refers to the special case of sum-frequency generation where radiation of one frequency, for example $w_1$, is much more intense than that at $w_2$ and, accordingly, does not undergo any appreciable change in amplitude as optical mixing occurs to give optical radiation of wavelength $w_3$. Optical mixing also includes higher order processes such as $w_5 = w_1 + 2w_2$ and $w_6 = 2w_1 - 2w_2$. For the purposes of this application, the optical radiation produced by optical mixing is generically referred to as "optical mixing radiation."

Efficient optical mixing within a nonlinear optical material is not usually possible unless the wave vectors, $k_1$, $k_2$ and $k_3$ of the interacting waves satisfy the momentum conservation equation or phase-matching condition that requires $$k_3 = k_1 + k_2$$

Satisfying this phase-matching requirement is not possible in isotropic crystals with normal dispersion because the refractive indices of the three different waves will necessarily be different as a consequence of dispersion. However, many nonlinear optical materials possess an anisotropy of refractive index which can be utilized to satisfy the phase-matching condition for a desired type of optical mixing.

Optical mixing can be carried out either within or outside of an optical cavity. If the process is carried out within an optical cavity, that cavity can be either: (a) a component of one of the sources of radiation for the process, or (b) separate from any cavity utilized as a component of any source of radiation for the process. For convenience, the use of such a source cavity will hereinafter be referred to as an intracavity process and the use of a separate cavity will be referred to as an external cavity process. For the purposes of this application, an optical cavity or resonator refers to a volume, which is bounded at least in part by highly reflecting surfaces, wherein light of certain discrete frequencies can set up standing wave modes of low loss.

The up-conversion of infrared radiation to the visible and ultraviolet range has been extensively studied. Such studies have been primarily motivated by an interest in using this technique to permit the detection and analysis of infrared radiation by the conventional and efficient methods that are available for light of higher frequency. Since the up-converted radiation carries essentially all of the information of the input infrared radiation, potential applications include infrared signal detection, infrared spectral analysis and infrared holography.

Up-conversion of infrared radiation has been reviewed by E. S. Voronin et al., *Sov. Phys. Usp.*, Vol. 22, No. 1, pp. 26–45 (Jan. 1979) and J. Warner, "Difference Frequency Generation and Up-Conversion" in *Quantum Electronics*, Vol. I, Nonlinear Optics, Part B, H. Rabin and C. L. Tang, Ed., Academic Press, N.Y., pp. 703–737 (1975). A theoretical discussion of infrared detection by sum-frequency generation has also been published by D. A. Kleinman et al., *J. Appl. Phys.*, Vol. 40, No. 2, pp. 546–566 (Feb. 1969).

At page 34 of their previously-cited review article, E. S. Veronin et al. describe the up-conversion of infrared radiation from a $CO_2$ laser within the cavity of a YAG:$Nd^{3+}$ laser using proustite as the nonlinear optical material. In addition, E. Liu et al., *Applied Optics*, Vol. 21, No. 19, pp. 3415–3416 (Oct. 1, 1982) have reported the generation of radiation at wavelengths in the range from 252 nm to 268 nm by intracavity sum-frequency generation in a 90° phase-matched temperature-tuned ammonium dihydrogen phosphate crystal, of selected output lines from an argon ion laser and the traveling wave in a rhodamine 110 ring dye laser. Further, U.S. Pat. No. 3,646,358, issued to Firester on Feb. 29, 1972, discloses the up-conversion of signal radiation from an external source within the cavity of a laser wherein the polarization of the signal beam is orthogonal to that of the pump beam which is generated within the laser cavity.

At pages 559–564 of their above-cited review article, D. A. Kleinman et al. have discussed the theoretical aspects of sum-frequency generation in an external cavity. In addition, V. L. Aleinikov et al., *Sov. J. Quantum Electron.*, Vol. 13, No. 8, pp. 1059–1061 (Aug. 1983), have analyzed the theoretical aspects of parametric up-conversion in an external cavity. Further, H. Hemmati et al., *Optics Letters*, Vol. 8, No. 2, pp. 73–75 (Feb. 1983), have reported the generation of radiation at a wavelength of 194 nm by sum-frequency generation in an external cavity using as input radiation: (a) the 257 nm second harmonic of the output of a continuous wave (cw) 515 nm argon-ion laser, and (b) the output of a tunable cw dye laser in the 792 nm region.

Difference-frequency generation has been reviewed in the above-cited review article in *Quantum Electronics*, Vol. I, at pp. 735–736 and by R. L. Aggarwal et al. in *Nonlinear Infrared Generation*, Y.-R. Shen, Ed., Springer-Verlag, Berlin, pp. 19–38 (1977).

There is a current need for efficient, compact and reliable lasers which operate in the infrared, visible and ultraviolet portion of the spectrum and are capable of modulation rates over the range from 0 Hz to in excess of 1 GHz over a wide range of intensities. Such devices would be useful for applications which include optical storage of data, reprographics, spectroscopy and communications. For example, the storage of data on optical disks requires a source of coherent radiation which can be modulated at a rate between about 5 and about 20 MHz, and such radiation is desirably in the visible or ultraviolet portion of the spectrum in order to maximize data storage within a given area. In addition, compact coherent sources of red, green and blue light would be highly attractive for television applications requiring a high brightness source. The use of three such lasers in place of the red, green and blue electron guns of a conventional television picture tube would result in a high brightness television projector that would be useful in simulation systems and large screen television systems. Laser diodes possess all of the above-described capabilities except for one—their output is in a limited part of the infrared portion of the electromagnetic spectrum at wavelengths in the range from about 750 nm to about 1600 nm.

SUMMARY OF THE INVENTION

The present invention is directed to an efficient, compact and reliable laser which can be operated in the infrared, visible and ultraviolet portion of the spectrum and is capable of modulation rates over the range from 0 Hz to in excess of 1 GHz.

We have discovered that coherent optical radiation (radiation in the infrared, visible and ultraviolet regions of the spectrum) can be produced by external cavity optical mixing using solid state components. More specifically, we have found that optical mixing can be carried out within an external cavity wherein at least one of the interacting beams of light is provided by a solid state device selected from the group consisting of laser diodes, laser diode arrays and diode-pumped solid state lasers. Because the frequency of the optical mixing radiation is a function of the initial frequencies, the wavelength of the output radiation can be conveniently varied over much of the optical spectrum and all of its visible portion merely by using different laser diodes or laser diode arrays in combination with an efficient rare earth metal transition of a diode-pumped solid state laser. In addition, the resulting device substantially retains the efficiency, reliability and compact size of its solid state components.

One embodiment of the invention is a method for generating coherent optical radiation which comprises: (a) generating coherent optical radiation of a first frequency, $w_1$, from a first source; (b) generating coherent optical radiation of a second frequency, $w_2$, from a second source which is selected from the group consisting of laser diodes, laser diode arrays and diode-pumped solid state lasers; (c) introducing said radiation of a first and second frequency into an optical cavity which is separate from any utilized as a component of said first and second sources; and (d) interacting said radiation of a first frequency and said radiation of a second frequency with a nonlinear optical material which is contained within said optical cavity to generate coherent optical radiation of a third frequency, $w_3$.

Another embodiment of the invention is an apparatus for generating coherent optical radiation which comprises: (a) means for generating coherent optical radiation of a first frequency, $w_1$; (b) means for generating coherent optical radiation of a second frequency, $w_2$, which is selected from the group consisting of laser diodes, laser diode arrays and diode-pumped solid state lasers; (c) an optical cavity which is separate from any utilized as a component of said first and second means for generating coherent optical radiation; (d) means for introducing said radiation of a first frequency and said radiation of a second frequency into said optical cavity; and (e) nonlinear optical means within said optical cavity which is positioned to interact with said radiation of a first frequency and said radiation of a second frequency to generate coherent optical radiation of a third frequency, $w_3$.

An object of the invention is to provide a solid state device for the generation of coherent radiation in the infrared, visible and ultraviolet portion of the spectrum.

Another object of the invention is to provide a compact source of coherent light in the infrared, visible and ultraviolet portion of the spectrum which is efficient and reliable.

Another object of the invention is to provide an easily modulated source of coherent radiation in the infrared, visible and ultraviolet portion of the spectrum.

Another object of the invention is to provide a solid state device for the generation of coherent optical radiation by optical mixing.

A further object of the invention is to provide an improved method for the production of coherent optical radiation by optical mixing.

A further object of the invention is to provide a method for the use of laser diodes and laser diode arrays in the production of coherent optical radiation by optical mixing.

A still further object of the invention is to provide a method for the use of a diode-pumped solid state laser in the production of coherent optical radiation by optical mixing.

DETAILED DESCRIPTION OF THE PREFERRED EMBODIMENTS

Figure 1:
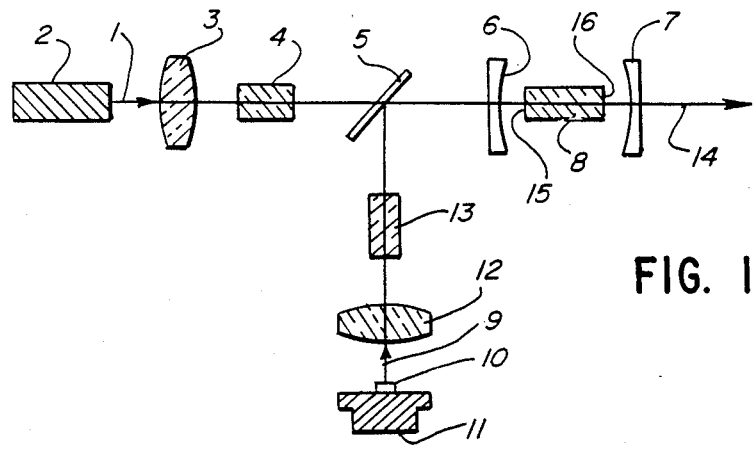
FIG. 1 of the drawings is a schematic representation of one embodiment of the invention.
Figure 2:
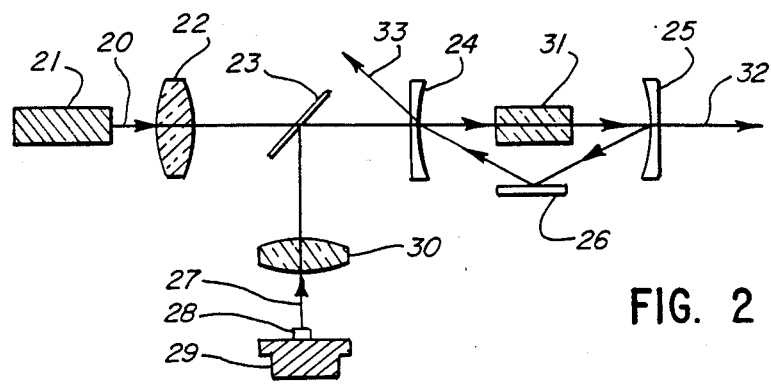
FIG. 2 of the drawings is a schematic representation of a second embodiment of the invention.
Figure 3:
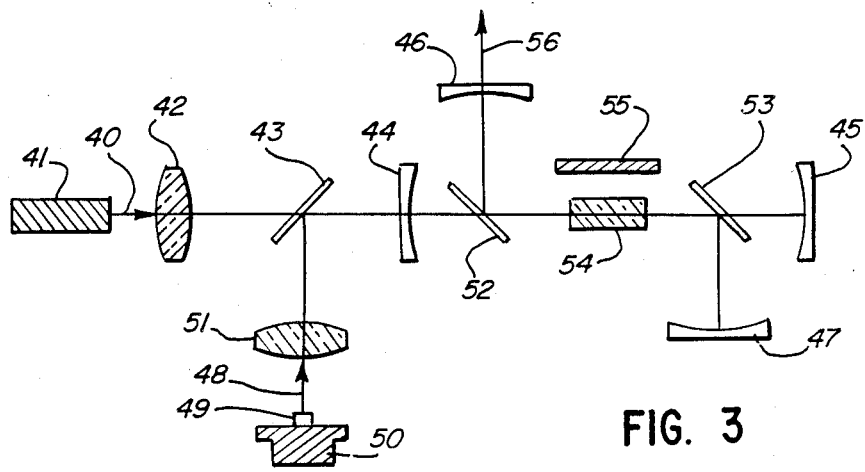
FIG. 3 of the drawings is a schematic representation of a third embodiment of the invention.

While this invention is susceptible of embodiment in many forms, there are schematically shown in FIGS. 1-3, three specific embodiments, with the understanding that the present disclosure is not intended to limit the invention to the embodiments illustrated.

With reference to FIG. 1, coherent input radiation 1 from radiation source 2 is focused by focusing means 3, passed through optical isolator 4 and 90-degree bending mirror 5, and injected into the optical cavity which is defined by mirrors 6 and 7 and contains nonlinear optical material 8. Coherent input radiation 9 from radiation source 10 and 11 is focused by focusing means 12, passed through optical isolator 13, reflected off 90-degree bending mirror 5, and injected into the optical cavity defined by mirrors 6 and 7. Input radiation 1 and input radiation 9 undergo optical mixing in nonlinear optical material 8 which is phase-matched for the desired optical mixing process, for example, sum-frequency generation. At least a portion of the resulting optical mixing radiation is passed through mirror 7 as output radiation 14.

Radiation source 10 and 11 is selected from the group consisting of laser diodes, laser diode arrays and diode-pumped solid state lasers. However, preferred radiation sources include laser diodes and laser diode arrays together with any ancillary packaging or structures. For example, such devices are commonly attached to a heat-resistant and conductive heat sink and are packaged in a metal housing. A highly suitable radiation source consists of a gallium aluminum arsenide laser diode 10 which is attached to heat sink 11. Heat sink 11 can be passive in character However, heat sink 11 can also comprise a thermoelectric cooler or other temperature regulation means to help maintain laser diode 10 at a constant temperature and thereby ensure optimal operation of laser diode 10 at a single wavelength. It will be appreciated, of course, that during operation the optical pumping means will be attached to a suitable power supply. Electrical leads from laser diode 10, which are directed to a power supply, are not illustrated in FIG. 1.

Conventional laser diodes and laser diode arrays are available which produce output radiation having a wavelength over the range from about 750 nm to about 1600 nm, and any such device can be used in the practice of this invention as the source of input radiation 9. For example, GaAlAs devices can be used to provide radiation in the wavelength range from about 750 nm to about 900 nm, and InGaAsP devices can be used to provide radiation in the wavelength range from about 1000 nm to about 1600 nm. With such a range of wavelengths (750-1600 nm) used in combination with input radiation 1 from rare earth metal laser transitions (for example, 1319 nm and 1064 nm from neodymium transitions) output radiation 14 produced by sum-frequency generation can be varied over the range from about 440 nm to beyond 650 nm.

A laser diode or laser diode array typically can be tuned over a wavelength range of about 10 nm by adjusting and controlling its operating temperature. Accordingly, when such a device is used to provide input radiation 9, the optical mixing output radiation 14 can be tuned over a modest wavelength range by temperature-tuning the laser diode or laser diode array. In view of this, a preferred embodiment of the invention involves tuning the wavelength of output radiation 14 by adjusting and controlling the temperature of the laser diode or laser diode array 10 which is used to provide input radiation 9. Alternatively, the laser diode or laser diode array can be tuned over a small range of wavelengths by varying the current which is applied to the device. Such tuning will, of course, usually require an adjustment to optimize the phase-matching conditions in nonlinear optical material 8. In noncritically phase-matched temperature tuned nonlinear optical materials, this can be easily accomplished by merely adjusting the temperature of the nonlinear optical material.

If desired, radiation source 10 and 11 can be a diode-pumped solid state laser. Suitable diode pumping means for such a laser include laser diodes, light-emitting diodes including superluminescent diodes and superluminescent diode arrays) and laser diode arrays. In addition, the diode-pumped solid state laser can comprise any conventional solid lasant material which can be optically pumped by the selected diode pumping means. Although the invention is not to be so limited, a highly satisfactory diode-pumped solid state laser is a neodymium-doped YAG laser which is optically pumped by a laser diode array and is frequency-doubled using a potassium titanyl phosphate nonlinear optical component to produce output radiation having a wavelength of 532 nm. Such a device is described in U.S. Pat. No. 4,653,056, issued to Baer et al. on Mar. 24, 1987. The combination of such 532 nm radiation as input radiation 9 with input radiation 1 having a wavelength of 1319 nm from a neodymium-doped YAG laser 2 can be used to generate sum-frequency output radiation 14 which is in the near-ultraviolet portion of the spectrum at a wavelength of 379 nm.

Radiation source 2 can be any source of coherent radiation. Suitable sources include, but are not limited to, dye lasers and solid state lasers. However, preferred radiation sources consist of the same laser diodes, laser diode arrays and diode-pumped solid state lasers which are described as suitable for use as radiation source 10 and 11.

A highly preferred radiation source 2 comprises an optically pumped solid lasant material. Suitable optical pumping means for the solid lasant material include, but are not limited to, laser diodes, light-emitting diodes (including superluminescent diodes and superluminescent diode arrays) and laser diode arrays. Suitable lasant materials include, but are not limited to, solids selected from the group consisting of glassy and crystalline host materials which are doped with an active material. Highly suitable active materials include, but are not limited to, ions of chromium, titanium and the rare earth metals. Highly suitable lasant materials include neodymium-doped YAG, neodymium-doped YALO and neodymium-doped YLF. By way of specific example, neodymium-doped YAG is a highly suitable lasant material for use in combination with an optical pumping means which produces light having a wavelength of about 810 nm. When pumped with light of this wavelength, neodymium-doped YAG can emit light having a wavelength of 1,064 nm.

One embodiment of the invention involves the use of a radiation source 2 comprising a fiber of lasant material which is end-pumped by an optical pumping means selected from the group consisting of laser diodes, light-emitting diodes and laser diode arrays. Highly suitable fibers for this purpose include, but are not limited to, glass optical fibers which are doped with ions of a rare earth metal such as neodymium. The length of such a fiber is easily adjusted to result in absorption of essentially all of the light from the optical pumping means. If a very long fiber is required, it can be coiled, on a spool for example, in order to minimize the overall length of the laser of this invention.

Focusing means 3 and focusing means 12 serve to focus input radiation 1 and 9, respectively, into the optical cavity which is defined by mirrors 6 and 7. This focusing is preferably such that the production of optical mixing radiation in nonlinear optical material 8 is optimized. Any conventional optical means for focusing light can be used as 3 and 12. For example, a gradient index lens, a ball lens, an aspheric lens or a combination of lenses can be utilized. It will be appreciated, that focusing means 3 and 12 are not essential to the practice of this invention and the use of such focusing means merely represents a preferred embodiment.

Optical isolators 4 and 13 serve to prevent any reflection of input radiation 1 and 9 back to its respective source from the external cavity which is defined by mirrors 6 and 7. Any such back-reflection will have an undesirable tendency to produce amplitude and frequency fluctuations in the output of radiation from source 2 and source 10 and 11. Any conventional means for effecting optical isolation of source 2 and source 10 and 11 can be used. For example, both 4 and 13 can be a Faraday isolator or a quarter wave plate. Alternatively, 4 and 13 can be omitted and back-reflections eliminated through the use of a travelling wave ring cavity for the external cavity (see FIG. 2) rather than a linear standing wave cavity. It will be appreciated, however, that optical isolation of the input sources is not essential to the practice of this invention and merely represents a preferred embodiment.

Input radiation 1 from source 2 is passed into nonlinear optical material 8 where it interacts with input radiation 9 from radiation source 10 and 11. By means of proper orientation of the nonlinear optical material with respect to the optical path of the interacting optical radiation (phase-matching), efficient optical mixing of the desired type occurs. In addition, phase-matching can be optimized and controlled by adjustment and control of the temperature of the nonlinear optical and material. By way of specific example, infrared radiation having a wavelength of 1064 nm from a diode-pumped neodymium-doped YAG laser 2 can be combined in nonlinear optical material 8 with light having a wavelength of 808 nm from radiation source 10 and 11 to produce, by sum-frequency generation, visible blue light having a wavelength of 459 nm. In this specific example, the nonlinear optical material 8 can be potassium titanyl phosphate with Type II noncritical phase-matching (where theta and phi equal 90 degrees).

The geometric shape of nonlinear optical material 8 can vary widely. For example, it can be rod-shaped or rhombohedral in shape and can have lens-shaped surfaces if desired. It will also be appreciated that any such nonlinear optical component can comprise heating or cooling means to control the temperature of said nonlinear optical material and thereby optimize the phase-matching. Noncritical phase-matching is usually preferred when possible due to elimination of walk-off.

Potassium titanyl phosphate, $KTiOPO_4$, is a highly preferred nonlinear optical material. However, it will be appreciated that any nonlinear optical material can be utilized in the practice of this invention. Suitable nonlinear optical materials include, but are not limited to, $KH_2PO_4$, $LiNbO_3$, $KNbO_3$, $\beta\text{-}BaB_2O_4$, $Ba_2NaNb_5O_{15}$, $LiIO_3$, $HIO_3$, $KB_5O_8\cdot4H_2O$, potassium lithium niobate, urea and compounds of the formula $MTiO(XO_4)$ where M is selected from the group consisting of K, Rb and Tl, and X is selected from the group consisting of P and As.

It will be appreciated, of course, that for radiation of two different frequencies, $w_1$ and $w_2$, the phase-matching conditions will ordinarily be different for each type of optical mixing process in a given nonlinear optical material. For example, where $w_1$ is greater than $w_2$, the phase-matching conditions for sum-frequency generation ($w_3 = w_1 + w_2$) will ordinarily be different from those for difference-frequency generation ($w_4 = w_1 = w_2$) since $w_3$ and $w_4$ are different. Indeed, satisfactory phase-matching conditions and optical transparency may exist for certain optical mixing processes but not others in a given nonlinear optical material. Accordingly, the desired optical mixing process can be obtained by control of the phase-matching conditions. The procedures and criteria for the selection and phase-matching of nonlinear optical materials for a given optical mixing process are conventional.

In a preferred embodiment of the invention, input radiation 1 and input radiation 9 are both polarized and the polarizations adjusted in such a manner that the efficiency of optical mixing in nonlinear optical material 8 is optimized. For example, with sum-frequency generation, these polarizations should be orthogonal for Type II phase-matching and identical for Type I phase-matching. If unpolarized, input radiation 1 and 9 can be polarized by any conventional means, for example, by use of a Brewster plate within the optical cavity of the source for such radiation. However, input radiation 1 and 9 from many suitable sources will be inherently polarized. For example, coherent radiation from conventional laser diodes and conventional multistripe laser diode arrays is inherently polarized as is laser radiation from a suitably oriented neodymium-doped YALO or YLF lasant material.

The external optical cavity, which is defined by mirrors 6 and 7 functions as a resonator for: (a) either input radiation 1 or 9; (b) both input radiation 1 and 9; (c) either input radiation 1 or 9 and output radiation 14; or (d) input radiation 1 and 9 and output radiation 14. However, for simplicity, the following discussion of FIG. 1 will be in terms of an external optical cavity which is resonant only for input radiation 1.

For an external cavity which is resonant only for input radiation 1, mirrors 6 and 7 are highly reflecting for input radiation 1 and highly transmitting for input radiation 9 and output radiation 14. Typically, input mirror 6 will have a small transmittance at the wavelength of input radiation 1, and this transmittance can, in theory, be adjusted to give a zero back-reflection of input radiation 1. However, this condition is difficult to achieve in practice. Accordingly, radiation source 2 can be isolated from the external cavity by the use of optical isolator 4, if desired. Optical isolator 13 will not be required for this embodiment unless there is a significant back-reflection of input radiation 9 from the external cavity.

For an external cavity which is resonant only for input radiation 1, the external cavity which is defined by mirrors 6 and 7 must satisfy the Fabry-Perot resonance condition for input radiation 1. Frequency-matching to satisfy the resonance condition can be achieved by adjusting the optical path length of either the external cavity or the optical cavity of radiation source 2 by conventional means, for example, temperature variation or electro-mechanical means, such as a piezoelectric translator mounting for one of the cavity mirrors. As an illustration, if temperature variation is used for both frequency-matching input radiation 1 with the external cavity and phase-matching nonlinear optical material 8, a preferred embodiment comprises stabilizing the external cavity at the required phase-matching temperature and temperature-adjusting the optical cavity length of radiation source 2 to satisfy the Fabry-Perot resonance condition.

Ninety-degree bending mirror 5 is constructed in such manner that it is highly reflective for input radiation 9 but substantially transparent to input radiation 1. For example, mirror 5 can comprise a suitable dielectric coating on a suitable substrate. It will be appreciated, however, that 90-degree bending mirror 5 is not an essential element of the invention. In the absence of 90-degree bending mirror 5, any convenient method can be utilized to inject input radiation 1 and 9 into the external cavity defined by mirrors 6 and 7.

Modulation of the optical mixing output radiation 14 can be easily accomplished by modulating input radiation 1 or 9. When a laser diode or laser diode array is used to provide input radiation, such modulation can be effected by modulation of the power supply to the laser diode or laser diode array. Conventional means are available for modulating the output from laser diodes and laser diode arrays over the range from 0 Hz to in excess of 1 GHz, and the use of all such modulation means represents a preferred embodiment of the invention. Alternatively, the optical mixing output radiation 14 can be modulated by modulating input radiation 1 emitted by the lasing of a lasant material through conventional techniques such as Q-switching, gain-switching or modelocking.

In a specific example of the embodiment illustrated in FIG. 1, radiation source 2 is a single-frequency neodymium-doped YAG laser having a polarized output, operating at a wavelength of 1,064 nm, and having associated with it conventional means for adjusting its output frequency over one free spectral range of the external cavity which is defined by mirrors 6 and 7 (external cavity). Output radiation 1 from source 2 is focused by means of a molded plastic or glass aspheric lens or gradient index lens in such a way that its output mode matches that of the $TEM_{oo}$ mode of the external cavity. Laser 2 is isolated from the external cavity by a permanent magnet Faraday isolator, a quarter wave plate or other conventional optical isolation means. Input radiation 9, which has a wavelength of 810 nm, is generated by a SHARP LT-015 laser diode 10. An optical system 12 transforms the astigmatic output 9 from laser diode 10 into a $TEM_{oo}$ mode which is focused so that its mode overlaps that of the external cavity as closely as possible. An optical isolator 13 is not used. Bending mirror 5 is a dichroic beam-splitter which is highly transmitting at the frequency and polarization of the radiation from source 2 and highly reflecting at the wavelength and polarization of the radiation from laser diode 10. Input mirror 6 of the external cavity has a radius of curvature of about 1 cm, has a transmittance in the range from about 0.5 to about 3 percent for radiation having a wavelength of 1,064 nm, and is highly-transmitting for radiation having a wavelength of 810 nm. Output mirror 7 of the external cavity has a radius of curvature of about 1 cm, is highly reflective for radiation having a wavelength of 1,064 nm, and is highly transparent for radiation having a wavelength of 460 nm which is produced by sum-frequency generation. The spacing between mirrors 6 and 7 is adjusted so that the beam waist within the external cavity satisfies the confocal condition for the length of the nonlinear optical material 8. Nonlinear optical material 8 is a rhombohedral prism of potassium titanyl phosphate which is oriented for sum-frequency generation by combination of 810 and 1,064 nm wavelength radiation, is antireflection-coated for radiation of a 1,064 nm wavelength on both input face 15 and output face 16, and is physically located in the center of the external cavity. The optical path length of the external cavity is stabilized by fixing mirrors 6 and 7 in a mechanically rigid structure and accurately controlling its temperature by conventional means Radiation source 2 is adjusted so that it is resonant with the external cavity. Finally, sum-frequency radiation 14, having a wavelength of 460 nm, is transmitted through mirror 7.

FIG. 2 schematically illustrates a second embodiment of the invention wherein a travelling wave ring cavity is used as the external cavity in place of the linear standing wave cavity illustrated in FIG. 1. With reference to FIG. 2, coherent input radiation 20 from radiation source 21 is focused by focusing means 22, passed through bending mirror 23, and injected into the external optical cavity which is defined by mirrors 24, 25 and 26. Coherent input radiation 27 from radiation source 28 and 29 is focused by focusing means 30, reflected off bending mirror 23, and injected into the external cavity. Source 28 and 29 is selected from the group consisting of laser diodes, laser diode arrays and diode-pumped solid state lasers. For example, 28 can be a laser diode and 29 an associated thermoelectric cooler. Input radiation 20 and input radiation 27 undergo optical mixing in nonlinear optical material 31, which is phase-matched for the desired optical mixing process, and optical mixing radiation is passed through mirror 25 as output radiation 32.

In the embodiment illustrated by FIG. 2, the beam of radiation in the external cavity (defined by mirrors 24, 25 and 26) travels in only one direction, and the back-reflected beam 33 is not colinear with the input radiation from source 21 and source 28 and 29. Accordingly, these sources are optically isolated from the external resonator. Back-reflected beam 33 from the external ring cavity can be used to monitor the resonance condition in the external cavity since, at the wavelength of the input radiation of interest, the intensity and phase of beam 33 are both dependent upon the frequency match between the external cavity and the input beam.

FIG. 3 schematically illustrates a third embodiment of the invention wherein output radiation is separated from optical mixing radiation within the external cavity through the use of beam splitters. With reference to FIG. 3, coherent input radiation 40 from input source 41 is focused by focusing means 42, passed through bending mirror 43, and injected into the external cavity which is defined by mirrors 44, 45, 46 and 47. Coherent input radiation 48 from radiation source 49 and 50 is focused by focusing means 51, reflected off bending mirror 43, and injected into the external cavity. Source 49 and 50 is selected from the group consisting of laser diodes, laser diode arrays and diode-pumped solid state lasers. For example, 49 can be a laser diode and 50 an associated thermoelectric cooler. Beam splitters 52 and 53 are substantially transparent to input radiation 40 and 48 but are highly reflective for optical mixing radiation 56. Input radiation 40 and input radiation 48 undergo optical mixing in nonlinear optical material 54, which is temperature-tuned for the desired optical mixing process through the use of resistance heater 55, and optical mixing radiation 56 is passed through mirror 46.

In the embodiment illustrated by FIG. 3, the external cavity can be resonant for: (a) either input radiation 40 or 48; (b) both input radiation 40 and 48; (c) either input radiation 40 or 48 and output radiation 56; or (d) input radiation 40 and 48 and output radiation 56. For an external cavity which is resonant for input radiation 40 and optical mixing radiation 56, mirrors 44, 45, 46 and 47 can have the following characteristics:

| Mirror | Properties |
| --- | --- |
| 44 | About 99% reflective for radiation 40 and substantially transparent for radiation 48. |
| 45 | Highly reflective for radiation 40. |
| 46 | About 99% reflective for radiation 56. |
| 47 | Highly reflective for radiation 56. |

With such a doubly resonant external cavity, input radiation 40 resonates between mirrors 44 and 45 while optical mixing radiation 56 resonates between mirrors 4 and 47. For an external cavity which is resonant for input radiation 40 and 48 and optical mixing radiation 56, mirrors 44, 45, 46 and 47 can have the following characteristics:

| Mirror | Properties |
| --- | --- |
| 44 | About 99% reflective for radiation 40 and about 1 to 20% transmissive for radiation 48. |
| 45 | Highly reflective for radiation 40 and 48. |
| 46 | About 1 to 20% transmissive for radiation 56. |
| 47 | Highly reflective for radiation 56. |

With such a triply resonant external cavity, input radiation 40 and 48 resonates between mirrors 44 and 45, while optical mixing radiation resonates between mirrors 46 and 47.

We claim:

1. A method for generating coherent optical radiation which comprises:
    (a) generating coherent optical radiation of a first frequency, $w_1$, from a first source;
    (b) generating coherent optical radiation of a second frequency, $w_2$, from a second source, wherein said second source comprises a laser diode;
    (c) introducing said radiation of frequency $w_1$ and said radiation of frequency $w_2$ into an optical cavity; and
    (d) converting said radiation of frequency $w_1$ and said radiation of frequency $w_2$ into coherent optical radiation of a third frequency, $w_3$, by optical mixing within a nonlinear optical material which is contained within said optical cavity.

2. The method of claim 1 wherein said second source comprises a laser diode array.

3. The method of claim 1 wherein said optical cavity is separate from any utilized as a component of said first and second sources.

4. The method of claim 3 wherein said optical cavity is resonant for radiation of frequency $w_1$.

5. The method of claim 3 wherein said optical cavity is resonant for radiation of frequency $w_2$.

6. The method of claim 3 wherein $w_3 = w_1 + w_2$.

7. The method of claim 3 wherein $w_3$ is the difference between $w_1$ and $w_2$.

8. The method of claim 3 wherein said first source comprises a laser diode.

9. The method of claim 8 wherein said first source comprises a laser diode array.

10. The method of claim 3 wherein said first source comprises a diode-pumped solid state laser.

11. The method of claim 10 wherein the diode pump of said diode-pumped solid state laser comprises a laser diode array.

12. The method of claim 3 wherein said first source comprises a diode-pumped frequency-doubled solid state laser.

13. The method of claim 3 which additionally comprises modulating said radiation of a third frequency by modulating said radiation of a second frequency.

14. The method of claim 3 which additionally comprises adjusting and controlling the polarization of said radiation of a first frequency and the polarization of said radiation of a second frequency to optimize the generation of said radiation of a third frequency.

15. The method of claim 3 wherein said nonlinear optical material comprises potassium titanyl phosphate.

16. An apparatus for generating coherent optical radiation which comprises:
(a) means for generating coherent optical radiation of a first frequency, $w_1$;
(b) means for generating coherent optical radiation of a second frequency, $w_2$, which comprises a laser diode;
(c) an optical cavity;
(d) means for introducing said radiation of a first frequency and said radiation of a second frequency into said optical cavity; and
(e) nonlinear optical means within said optical cavity for converting said radiation of a first frequency and said radiation of a second frequency into coherent optical radiation of a third frequency, $w_3$, by optical mixing.

17. The apparatus of claim 16 wherein said means for generating said radiation of a second frequency comprises a laser diode array.

18. The apparatus of claim 16 wherein said optical cavity is separate from any utilized as a component of said first and second means for generating coherent optical radiation.

19. The apparatus of claim 18 wherein said optical cavity is resonant for radiation of frequency $w_1$.

20. The apparatus of claim 18 wherein said optical cavity is resonant for radiation of frequency $w_2$.

21. The apparatus of claim 18 wherein $w_3 = w_1 + w_2$.

22. The apparatus of claim 18 wherein $w_3$ is the difference between $w_1$ and $w_2$.

23. The apparatus of claim 18 wherein said means for generating said radiation of a first frequency comprises a laser diode.

24. The apparatus of claim 18 wherein said means for generating said radiation of a first frequency comprises a laser diode array.

25. The apparatus of claim 18 wherein said means for generating said radiation of a first frequency comprises a diode-pumped solid state laser.

26. The apparatus of claim 25 wherein the diode pump of said diode-pumped solid state laser comprises a laser diode array.

27. The apparatus of claim 18 wherein said means for generating said radiation of a first frequency comprises a diode-pumped frequency-doubled solid state laser.

28. The apparatus of claim 18 which additionally comprises means for effecting the modulation of said radiation of a second frequency.

29. The apparatus of claim 18 which additionally comprises means for adjusting and controlling the polarization of said radiation of a first frequency and the polarization of said radiation of a second frequency.

30. The apparatus of claim 18 wherein said nonlinear optical means is comprised of potassium titanyl phosphate.

* * * * *

UNITED STATES PATENT AND TRADEMARK OFFICE
CERTIFICATE OF CORRECTION

PATENT NO. : 4,879,722

DATED : November 7, 1989

INVENTOR(S) : George J. Dixon, Douglas W. Anthon, John H. Clark

It is certified that error appears in the above-identified patent and that said Letters Patent is hereby corrected as shown below:

Column 6, line 35, "character However" should read --character. However--.

Column 7, lines 15 & 16, "diodes including" should read --diodes (including--.

Column 9, line 15, "$w_4 = w_1 = w_2$" should read --$w_4 = w_1 - w_2$--.

Column 11, line 17, "means Radiation" should read --means. Radiation--.

Column 12, lines 25 & 26, "mirrors 4 and 47" should read --mirrors 46 and 47--.

Signed and Sealed this

Fourth Day of June, 1991

Attest:

HARRY F. MANBECK, JR.

Attesting Officer

Commissioner of Patents and Trademarks